United States Patent
Pais et al.

(10) Patent No.: US 9,866,057 B2
(45) Date of Patent: Jan. 9, 2018

(54) BATTERY TEMPERATURE MAINTENANCE WHEN TEMPERATURES FALL BELOW A THRESHOLD TEMPERATURE VALUE

(71) Applicant: MOTOROLA MOBILITY LLC, Chicago, IL (US)

(72) Inventors: Martin R. Pais, North Barrington, IL (US); Hossein Maleki, Duluth, GA (US)

(73) Assignee: Motorola Mobility LLC, Chicago, IL (US)

( * ) Notice: Subject to any disclaimer, the term of this patent is extended or adjusted under 35 U.S.C. 154(b) by 170 days.

(21) Appl. No.: 14/803,277

(22) Filed: Jul. 20, 2015

(65) Prior Publication Data

US 2017/0005498 A1 Jan. 5, 2017

Related U.S. Application Data

(60) Provisional application No. 62/186,521, filed on Jun. 30, 2015.

(51) Int. Cl.
*H02J 7/00* (2006.01)

(52) U.S. Cl.
CPC .......... *H02J 7/0072* (2013.01); *H02J 7/0021* (2013.01); *H02J 7/0042* (2013.01)

(58) Field of Classification Search
CPC .................................................. H02J 7/0072
USPC ............................................. 320/103, 112
See application file for complete search history.

(56) References Cited

U.S. PATENT DOCUMENTS

| | | | | |
|---|---|---|---|---|
| 5,490,572 A | * | 2/1996 | Tajiri | B60H 1/00278 180/65.1 |
| 6,440,602 B1 | * | 8/2002 | Morita | H01M 2/1061 429/100 |
| 7,088,887 B2 | * | 8/2006 | Ascanio | G02B 6/12026 219/209 |
| 7,573,154 B2 | * | 8/2009 | Tsui | H02J 7/0013 307/42 |
| 2005/0040787 A1 | * | 2/2005 | Choi | H02J 7/0063 320/103 |
| 2006/0028167 A1 | * | 2/2006 | Czubay | B60K 6/48 320/104 |
| 2006/0164032 A1 | * | 7/2006 | Johnson | B25F 5/00 320/103 |
| 2009/0139781 A1 | * | 6/2009 | Straubel | B60L 11/1875 180/65.1 |
| 2012/0228279 A1 | * | 9/2012 | Haas | A41D 13/0051 219/211 |
| 2013/0143100 A1 | * | 6/2013 | Bennis | H04M 1/0262 429/156 |

(Continued)

*Primary Examiner* — M'Baye Diao
(74) *Attorney, Agent, or Firm* — Matthew C. Loppnow; Watson Intellectual Property Group

(57) ABSTRACT

A user device can include a first battery configured to power the user device and a second battery configured to power the user device. The user device can further include a temperature sensor configured to monitor a temperature of the second battery and a heating element configured to heat the second battery to increase an operating efficiency of the second battery when a temperature of the user device falls below a threshold temperature value. A switch can be configured to switch on the heating element to heat the second battery when the temperature sensor determines that the second battery is below a threshold temperature value.

20 Claims, 6 Drawing Sheets

(56) References Cited

U.S. PATENT DOCUMENTS

| | | | |
|---|---|---|---|
| 2014/0009105 A1* | 1/2014 | Keates | H01M 10/425 320/103 |
| 2016/0020496 A1* | 1/2016 | Burrows | H01M 10/482 429/62 |
| 2016/0359207 A1* | 12/2016 | Cornelius | H01M 2/1022 |

* cited by examiner

BATTERY TEMPERATURE MAINTENANCE WHEN TEMPERATURES FALL BELOW A THRESHOLD TEMPERATURE VALUE

BACKGROUND

1. Field

The present disclosure is directed to a method and apparatus for maintaining a battery temperature when temperatures fall below a threshold temperature value. More particularly, the present disclosure is directed to maintaining a battery temperature above a threshold temperature value to allow use of a user device.

2. Introduction

Customers can carry user devices to communicate with other user devices. The scenarios of such use can vary, with one scenario having a customer using a user device in a cold ambient or weather exposure scenario. Such a cold ambient or weather exposure scenario poses significant performance limitations on the ability of the user device to operate.

In particular, if a battery of the user device is allowed to cool down below a certain threshold temperature value, internal chemistry (reaction rate) of the battery becomes sluggish, resulting in low energy delivery and/or high charge transfer impedance. Such battery issues become more pronounced in an older aged battery. For example, a lithium-ion (Li-ion) battery can provide approximately 10-15% power at 0.2 degrees centigrade when new. However, as the Li-ion battery ages, the power that can be produced reduces, depending on a state of health of the Li-ion battery.

An amount of power a battery can produce eventually reduces enough such that the battery cannot generate sufficient power to 'fire-up' and run a user device. Such a reduction is particularly a problem when the battery becomes too cold and the user device is being used for an emergency phone call. Such a reduced state can even occur when the battery is in a fully charged state.

Further, charging a battery below a certain threshold temperature value is deleterious to the health of the battery, leading to such problems as Li-plating that causes a drop in battery performance and in extreme cases leads to short-circuits.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

There is a need for a method and apparatus that allows for continued use of a user device at temperatures below a threshold temperature value that would otherwise leave a user device inoperative. Having a battery or cell within the battery fully charged and warm enough when temperatures fall below the threshold temperature value may be advantageous for operating the user device, especially in an emergency situation where operation of the user device is critical.

Embodiments provide a method and apparatus, such as a user device, comprising a first battery, a second battery, and a heating element. The first battery can be configured to power the user device and the second battery can be configured to power the user device, where the second battery can be of a smaller capacity than the first battery. The heating element can be configured to generate heat within the second battery to increase an operating efficiency of the second battery when a temperature falls below a threshold temperature value.

Embodiments can provide for a user device comprising a first battery configured to power the user device and a second battery configured to power the user device. The user device can further comprise a temperature sensor configured to monitor a temperature of the second battery and a heating element configured to heat the second battery to increase an operating efficiency of the second battery when the temperature falls below a threshold temperature value. A switch can be configured to switch on the heating element to heat the second battery when the temperature sensor determines that the second battery is below the threshold temperature value.

Figure 1:
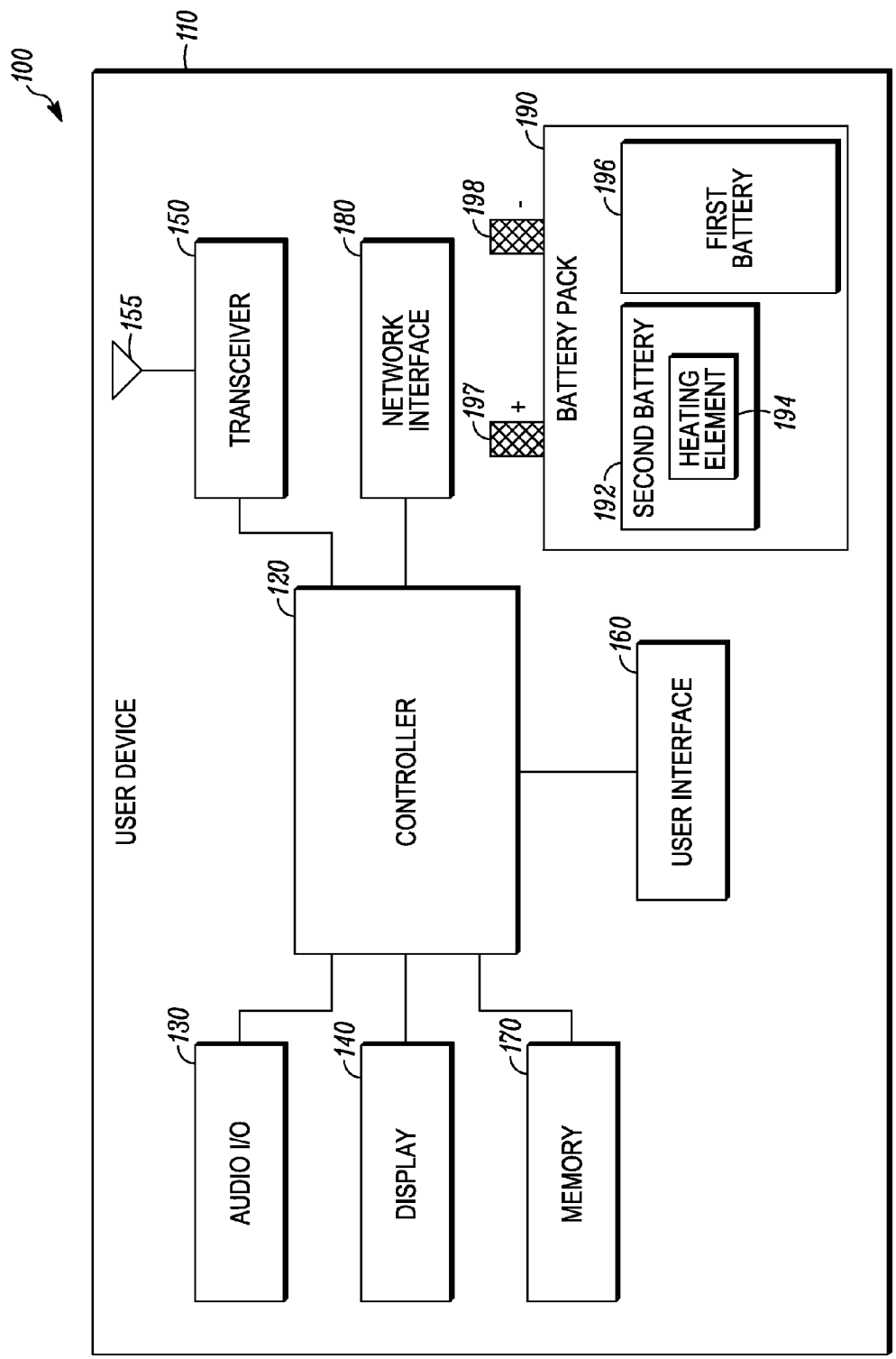
FIG. 1 illustrates a block diagram of an example apparatus, according to a possible embodiment.

FIG. 1 illustrates a block diagram of a user device 100, according to a possible embodiment. The user device 100 can be a wireless terminal, a portable wireless communication device, a smartphone, a cellular telephone, a flip phone, a personal digital assistant, a personal computer, a tablet computer, or any other user device 100 that can experience temperatures that can inhibit a battery powering the user device 100.

The user device 100 can include a housing 110, a controller 120 within the housing 110, audio input and output circuitry 130 coupled to the controller 120, a display 140 coupled to the controller 120, a transceiver 150 coupled to the controller 120, an antenna 155 coupled to the transceiver 150, a user interface 160 coupled to the controller 120, a memory 170 coupled to the controller 120, and a network interface 180 coupled to the controller 120. The user device 100 can further include a battery pack 190, where the battery pack 190 can include an anode terminal 197, a cathode terminal 198, a first battery 196, a second battery 192, and a heating element 194. The user device 100 can perform the methods described in all the embodiments.

The display 140 can be a viewfinder, a liquid crystal display (LCD), a light emitting diode (LED) display, a plasma display, a projection display, a touch screen, or any other device that displays information. The transceiver 150 can include a transmitter and/or a receiver. The audio input and output circuitry 130 can include a microphone, a speaker, a transducer, or any other audio input and output circuitry. The user interface 160 can include a keypad, a keyboard, buttons, a touch pad, a joystick, a touch screen display, another additional display, or any other device useful for providing an interface between a user and an electronic device. The network interface 180 can be a universal serial bus port, an Ethernet port, an infrared transmitter/receiver, a USB port, an IEEE 1394 port, a WLAN transceiver, or any other interface that can connect an apparatus to a network or computer and that can transmit and receive data communication signals. The memory 170 can include a random access memory, a read only memory, an optical memory, a flash memory, a removable memory, a hard drive, a cache, or any other memory that can be coupled to the user device 100.

The user device 100 or the controller 120 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 170 or elsewhere on the user device 100. The user device 100 or the controller 120 may also use hardware to implement disclosed operations. For example, the controller 120 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 120 may be any controller or processor device or devices capable of operating an electronic device and implementing the disclosed embodiments.

The network interface 180 can be a wired communication interface, such as a universal serial bus interface, a serial wire interface, a parallel wire interface, an Ethernet interface, or other wired interface, can be an optical interface, such as an infrared interface, can be a wireless interface, such as a Bluetooth® interface, a Wi-Fi interface, a wireless local area network interface, a cellular network interface, a satellite network interface, a wireless wide area network interface, or can be any other interface or combination of interfaces. The transceiver 150 can be a wireless wide area network transceiver that can receive a random challenge and an authentication token from a wireless wide area network.

The battery pack 190 can be coupled to the electrical components 120, 130, 140, 150, 160, 170, and 180 of the user device 100. In operation, the battery pack 190 can provide operating power for the electrical components 120, 130, 140, 150, 160, 170, and 180 of the user device 100. When at least one cell within the battery pack 190 is required to provide energy for the user device 100 under cold conditions in which temperatures drop below the threshold temperature value embodiments can keep that same cell(s) warm for improved lower internal resistances. Not all cells within the battery pack 190 are required to be kept warm, only individual cell(s) that are needed to power the user device 100 may be kept warm.

The battery pack 190 can include a minimum of two independent cells, such as a first battery 196 and a second battery 192. The battery pack 190 can include non-identical cells, e.g., cells consisting of various capacities, physical sizes (large or small), different chemistries, other non-identical cells, or can be identical cells. The first battery 196 and the second battery 192 can be constructed of one or more of, for example, lead acid, Ni-MH, Ni-CAD, Li, and/or Li-ion, etc. For example, typical Li-ion cells demonstrate a high internal resistance under cold operating conditions. The first battery 196 and the second battery 192 can include physical constructions such as, for example, button cell, cylindrical, rolled, prismatic, and/or folded, and other physical constructions. The charge and/or discharge rates of the first battery 196 and the second battery 192 can be either equal or unequal. In at least one embodiment, the first battery 196 and the second battery 192 can be independent of one another, each forming individual battery packs.

The battery pack 190 can include an anode terminal 197 and a cathode terminal 198. The first battery 196 can be a primary power source for the user device 100 and provide power under normal use scenarios, such as when the user device 100 is being operated at or above the threshold temperature value. The first battery 196 can power the user device 100 when the user device 100 is being operated within a temperature range including temperature values at which the first battery 196 is able to produce adequate power to power the user device 100. In at least one embodiment, the first battery 196 and the second battery 192 can each be in separate battery packs or, alternately, integrated into a single battery pack, such as battery pack 190. The first battery 196 can provide power to charge the second battery 192, such as to maintain emergency availability of the user device 100.

The second battery 192 can be a small pack by volume relative to the first battery 196. The second battery 192 can be a same physical size as the first battery 196, but with a capacity that is smaller than the first battery 196. The second battery 192 can have a smaller footprint than the first battery 196 but similar in thickness as the first battery 196, can be thinner in thickness than the first battery 196 but similar in footprint as the first battery 196, or can be thinner in thickness and smaller in footprint. The second battery 192 can be comprised of a small Li-ion cell with low thermal mass and high rate capability to provide self-heating for a given load current. The second battery 192 can be constructed of very high rate chemistry, very high impedance to self-warm as a result of current drain and internal resistance. Li-ion battery/cell designs are mainly focused on energy density (ED) Watt-hour/Liter (Wh/L), safety/thermal stability, and cycle-life performance. Generally, typical Li-ion battery/cell designs include a cathode (for example, $LiCoO_2$, $LiMn_{1.5}Ni_{0.5}O_4$, $LiFePO_4$, or any other materials serving as a cathode), a Graphite anode, and an electrolyte that consists of Li-based salt (for example, $LiPF_6$, LiDFOB, LiFOP, or any other salt material) and a mixture of organic solvents with an energy density having an inverse relation with rate capability. A higher energy density cell typically has a higher impedance than a same cell design with lower energy density.

The second battery 192 can be a backup power source for the user device 100. The second battery 192 can power the user device 100 when the user device 100 is being operated below a threshold temperature value at which the first battery 196 is unable to produce adequate power to power the user device 100. The second battery 192 can be sized to provide sufficient power for what may be deemed an "emergency" call. For example, assuming an emergency call may need, e.g., 2.5 Watts of power and the first battery 196 is capable of providing 2.5 Watts of power. The second battery 192 may be one-tenth a size of the first battery 196, but at a temperature capable to provide the 2.5 Watts at any time. In this example, the second battery 192 can provide emergency power with a temperature of the second battery 192 being held at a reasonable temperature to allow continued operation of the user device 100. The user device 100 can use power produced by the second battery 192 to make such an emergency call.

The second battery 192 may be a small cell design comprised of a resistive heating element 194 that can be constructed of, for example, carbon, conductive polymer, nichrome, and/or other materials. The second battery 192 may be dissipated either partially or entirely eventually nearing a capacity of the second battery 192. During the second battery 192 discharge, the first battery 196 can warm as well because of a close proximity to the second battery 192.

The heating element 194 can generate heat or thermal energy to allow the second battery 192 to continue to provide power when the user device 100 is being operated below the threshold temperature value. The heating element 194 can be embedded within the battery pack 190 proximate to the second battery 192, embedded within the second battery 192 and/or located proximate to the second battery 192 outside of the battery pack 190. In at least one embodiment, the heating element 194 can short the terminals of the second battery 192 to generated heat within the second battery 192. In at least one additional embodiment, the heating element 194 can completely encompass the second battery 192. In at least one further embodiment, the heating element 194 can border one or more sides of the second battery 192 and/or one or more cells within the second battery 192. In at least one embodiment, the heating element 194 can be in parallel with the second battery 192. In at least one additional embodiment, the heating element 194 can be in series with the second battery 192.

The heating element 194 can generate heat to supplement heat generated by very high rate chemistry and/or very high impedance of the second battery 192. In at least one embodiment, the heating element 194 of the second battery 192 can include a thick electrode coating that has higher impedance and consequently higher self thermal-rise upon discharge. In at least one embodiment, the heating element 194 of the second battery 192 can include chemicals, such as electrolyte additives, or thin film, such as one or more layers of high loading/impedance electrode or a thin film battery that inherently has high impedance, showing very high thermal activation and generating heat when exposed to small load current at beginning/during a cold start/operation. In at least one embodiment, the heating element 194 can be the controller 120 positioned proximate to the second battery 192. The controller 120 can be triggered to execute a processor intensive operation, such as, a numerically intensive algorithm, to generate heat within the controller 120 for the second battery 192.

Battery/cell uniform self heating under cold temperatures and charge/discharge is useful for battery health. This situation may not occur for aged batteries/cells, depending on battery/cell usage history that have led to non-uniform current distribution among the electrode layers. The battery pack 190 can either be one physical battery package containing multiple cells, or more broadly, any collection of battery cells acting collectively as a pack combining the capacities of each cell in a way benefiting the user device 100. At least one cell of the battery pack 190 can be maintained under improved thermal conditions so as to lower its impedance allowing the battery pack 190 to perform better under cold temperature scenarios. The remaining cells may not be discharged so as to provide power under normal use scenarios.

When the battery pack 190 is charged or discharged, some waste heat can be produced. This waste heat can warm up the battery pack 190. The temperature rise of the battery pack 190 can be inversely proportional to its thermal mass:

$$\Delta \text{Temperature-rise} \alpha \frac{\text{Heat} - \text{Generation}}{\text{Mass} * \text{SpecificHeat}}$$

Figure 2:
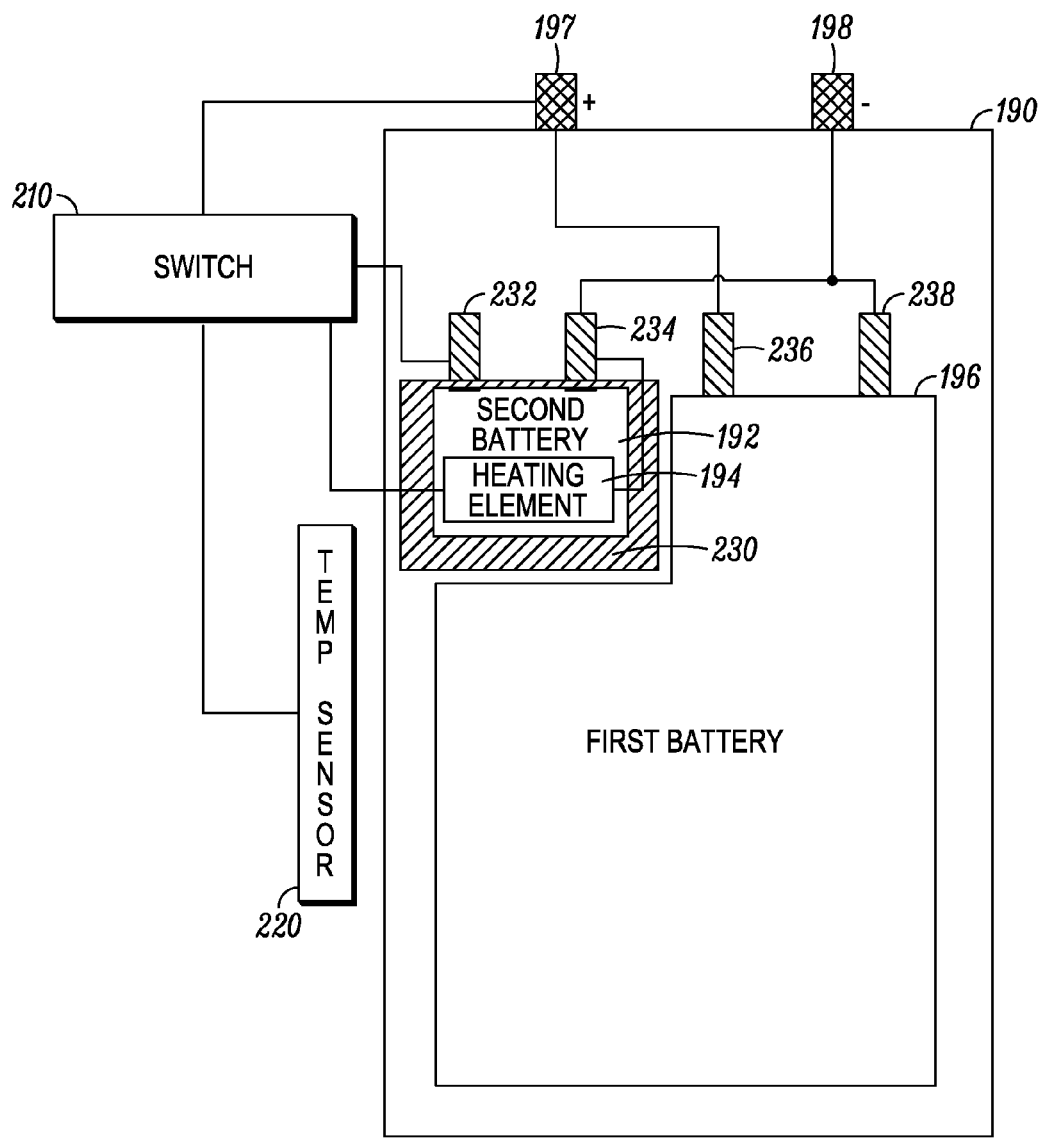
FIG. 2 illustrates an example implementation of the battery pack shown in FIG. 1 along with a switch to activate a heating element, according to a possible embodiment.

FIG. 2 illustrates an example implementation of the battery pack 190 shown in FIG. 1 along with a switch 210 to activate a heating element 194, according to a possible embodiment. In particular, the battery pack 190 can further include an associated switch 210, a temperature sensor 220, and a thermal insulator 230.

A cathode terminal 238 of the first battery 196 can be coupled to the cathode terminal 198 of the battery pack 190. The switch 210 can be coupled to the temperature sensor 220, the anode terminal 197 of the battery pack 190, an anode terminal 232 of the second battery 192, and the heating element 194. The temperature sensor 220 can be a thermistor, thermocouple, resistance thermometer, silicon bandgap temperature sensor, and/or any other sensor.

In one or more embodiments, the temperature sensor 220 can be an existing temperature sensor within the user device 100 that measures temperatures of, for example, the controller 120, the transceiver 150, the memory 170, and/or any other electrical component within the user device 100 that may be monitored for temperature. The temperature of the second battery 192 can be extrapolated from a temperature sensor measuring a temperature of such other electrical component(s). In one or more embodiments, the temperature of the second battery 192 can be monitored by one or more Android application PacKages (APKs) running on the user device 100.

The switch 210 can electrically couple and/or uncouple the first battery 196 and the second battery 192 from each other. In at least one embodiment, the switch 210 can electrically couple and/or uncouple the heating element from the second battery 192. The switch 210 can be triggered by the temperature sensor 220 to turn on current through the heating element 194. The switch 210 can be configured to switch on the heating element 194 when a temperature of the second battery 192 is below the threshold temperature value. In at least one embodiment, the switch 210 can be triggered by the temperature sensor 220 to turn on current through the heating element 194. The switch 210 can be triggered by the temperature sensor 220 to open a current path to discharge the second battery 192 to begin a heat cycle for the second battery 192. The first battery 196 and the second battery 192 can be connected in parallel, via the switch 210. The switch 210 can switch the first battery 196 and the second battery 192 in/out of use by the user device 100.

The temperature sensor 220 can be configured to monitor a temperature of the second battery 192. The temperature sensor 220 can sense if a temperature of the second battery 192 drops below a certain limit, such as the threshold temperature value, and trigger the switch 210 to begin the heat cycle. During the heat cycle, the second battery 192 can be heated to increase an operating efficiency of the second battery 192 when the temperature sensor 220 determines that the second battery 192 is below the threshold temperature value. Likewise, the switch 210 can be triggered by the temperature sensor 220 to turn off current between the anode terminal 232 of the second battery 192 and the anode terminal 197 of the battery pack 190. The temperature sensor 220 can sense if a temperature of the second battery 192 goes above the threshold temperature value and trigger the switch 210 to end the heat cycle accordingly. At normal temperatures, the switch 210 can allow the second battery 192 to stay at a full charge condition. Heating of the second battery 192 can result in improved, such as lower, internal resistance should the battery be needed to provide further current drain.

In at least one embodiment, the switch 210 and/or the temperature sensor 220 can be integrated within the battery pack 190. In at least one embodiment, the switch 210 and/or the temperature sensor 220 can be external to the battery pack 190. The switch 210 can be a, for example, field effect transistor (FET), junction gate field-effect transistor (JFET), metal-oxide-semiconductor field-effect transistor (MOSFET), or any other switch. For example, any type of switch that can be triggered by the temperature sensor 220 to allow current to flow from the second battery 192 to the anode terminal 197 of the battery pack 190 and heat the heating element 194 can be used with one or more embodiments. The second battery 192 can power the switch 210.

The thermal insulator 230 can thermally insulate the second battery 192 to retain heat within the second battery 192 and preserve battery charge of the second battery 192. The thermal insulator 230 can include one or more thermal insulting materials that assist in holding heat within the second battery 192, such as, for example, polystyrene foam, mineral wool, plastic, resin, and/or other thermal insulating materials. The thermal insulator 230 can fully enclose the second battery 192. In at least one embodiment, the thermal insulator 230 can border at least a portion of at least one or more sides of the second battery 192.

Figure 3:
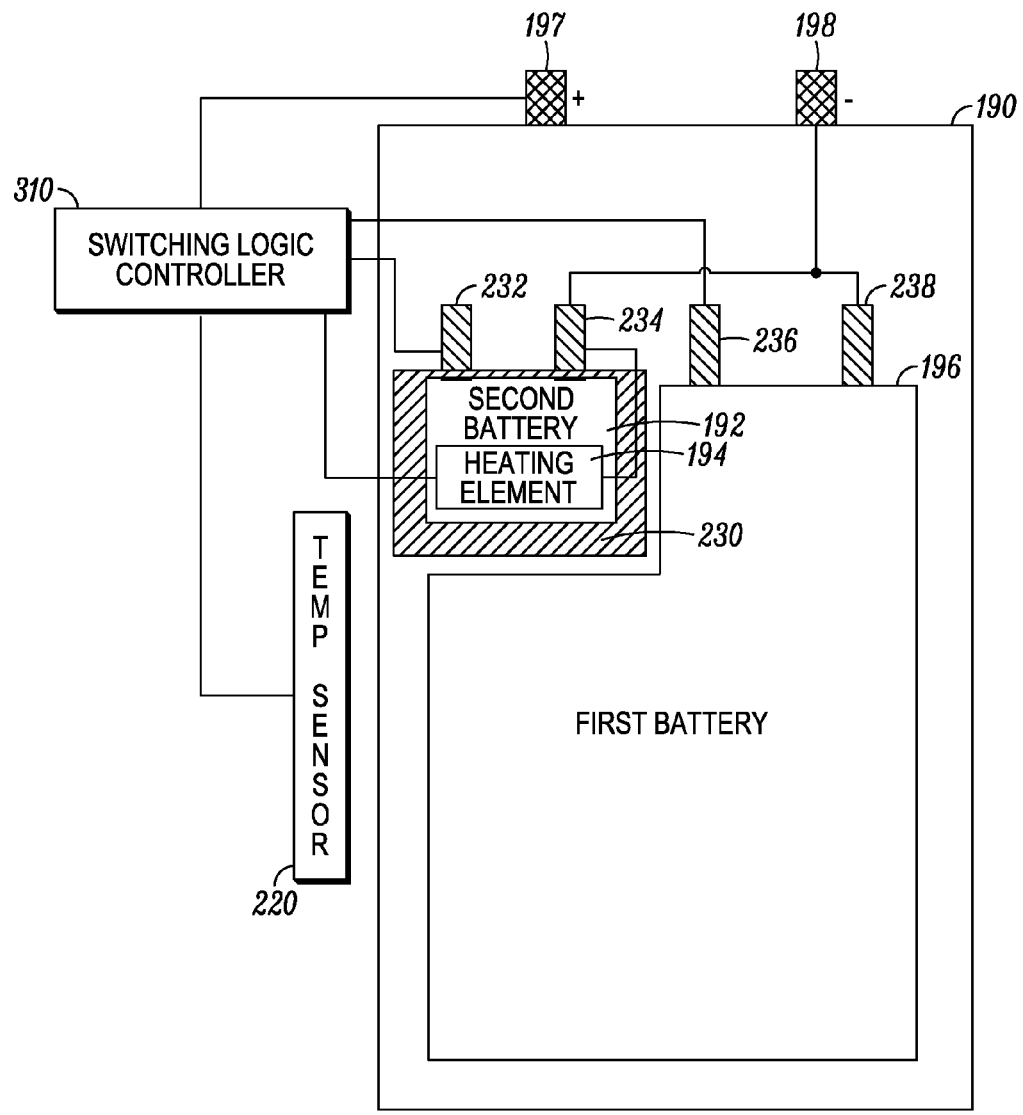
FIG. 3 illustrates an example implementation of the battery pack shown in FIG. 1 along with a switching logic controller to activate a heating element, according to a possible embodiment.

FIG. 3 illustrates an implementation of the battery pack 190 shown in FIG. 1 along with a switching logic controller 310 to activate the heating element 194, according to a possible embodiment. The switching logic controller 310 can perform the functions described above for the switch 210, and perform additional functions as described below.

The switching logic controller 310 can be coupled to the temperature sensor 220, the anode terminal 197 of the battery pack 190, the anode terminal 232 of the second battery 192, and the anode terminal 236 of the first battery 196. The switching logic controller 310 can connect and disconnect the first battery 196 and the second battery 192, and/or individual cells within the first battery 196 and the second battery 192 from the anode terminal 197 of the battery pack 190.

The switching logic controller 310 can determine a State of Charge (SOC) of the first battery 196 and the second battery 192. Battery/cell remaining capacity SOC may be estimated using any number of means including, for example, voltage and current measurements, coulombic means, tabularized means for accounting of discharge timing, and/or other estimations for remaining SOC. The switching logic controller 310 can selectively connect the first battery 196 and the second battery 192 to the user device 100 based on the SOC of the first battery 196 and/or the second battery 192. For example, the switching logic controller 310 can determine that the SOC of the first battery 196 and/or the second battery 192 is too low to power the user device 100. With the first battery 196 and/or the second battery 192 in such a low power state, the switching logic controller 310 can prevent the first battery 196 and/or the second battery 192 from powering the user device 100.

As the capacity from the second battery 192 is depleted, the switching logic controller 310 can sequentially disconnect the anode terminal 232 of second battery 192 from the anode terminal 197 of the battery pack 190, and instead connect the anode terminal 236 of the first battery 196 to the anode terminal 197 of the battery pack 190. This process can be repeated until all batteries/cells within batteries are equally and fully discharged.

The switching logic controller 310 can control the charge and/or the discharge of cells within the first battery 196 and the second battery 192. The switching logic controller 310 can control the charge and/or the discharge rates of the first battery 196 and the second battery 192 and/or charge and discharge rates of cells within the first battery 196 and the second battery 192. In at least one embodiment, the switching logic controller 310 can control charging and/or discharging in other modes. For example, the switching logic controller 310 can control charging and/or discharging of pairs of cells within the first battery 196 and the second battery 192.

The heating element 194 can provide residual heat to heat the first battery 196. As the capacity of the second battery 192 is diminished and the second battery 196 is warmed, the switching logic controller 310 can disconnect the second battery 192 from powering the user device 100 and connect the first battery 196 to power the user device 100. Should the power of the first battery 196 be diminished and a third battery (not shown) is warmed, the switching logic controller 310 can disconnect the first battery 196 and connect the third battery to power the user device 100. The number of batteries/cells that the switching logic controller 310 can connected/disconnected from powering the user device 100 is only limited by the number of batteries/cells powering the user device 100.

In at least one embodiment, the controller 120 can instead be connected to the electrical components described herein as being coupled to the switching logic controller 310, and instead perform the functions described herein as being performed by the switching logic controller 310.

The schematic block diagrams illustrated in FIGS. 2 and 3 comprise representations where the cathodes (negative terminals) are tied together and the anode connections can be individually controlled. However, in an alternate embodiment the anodes can be tied together and the cathode connections can be individually controlled, which can work equally as well. For example, the switch 210 and/or the switching logic controller 310 can instead be coupled to the cathode terminal 234 of the second battery 192 and the cathode terminal 238 of the first battery 196. In such an embodiment, the switch 210 and/or switching logic controller 310 can turn on current between the cathode terminal 234 of the second battery 192 and the cathode terminal 198 of the battery pack 190, and/or turn on current flow between the cathode terminal 238 of the first battery 196 and the cathode terminal 198 of the battery pack 190. In at least one embodiment, the switch 210 and/or switching logic controller 310 may reside on a separate circuit block from the electrical components 120, 130, 140, 150, 160, 170, and 180 of the user device 100. In at least one embodiment, the switch 210 and/or switching logic controller 310 may be either embedded within the battery pack 190 or located outside of the battery pack 190. In at least one embodiment, the switch 210 and/or switching logic controller 310 may control discharge of the first battery 196 and the second battery 192 independent of the operation of the controller 120.

Figure 4:
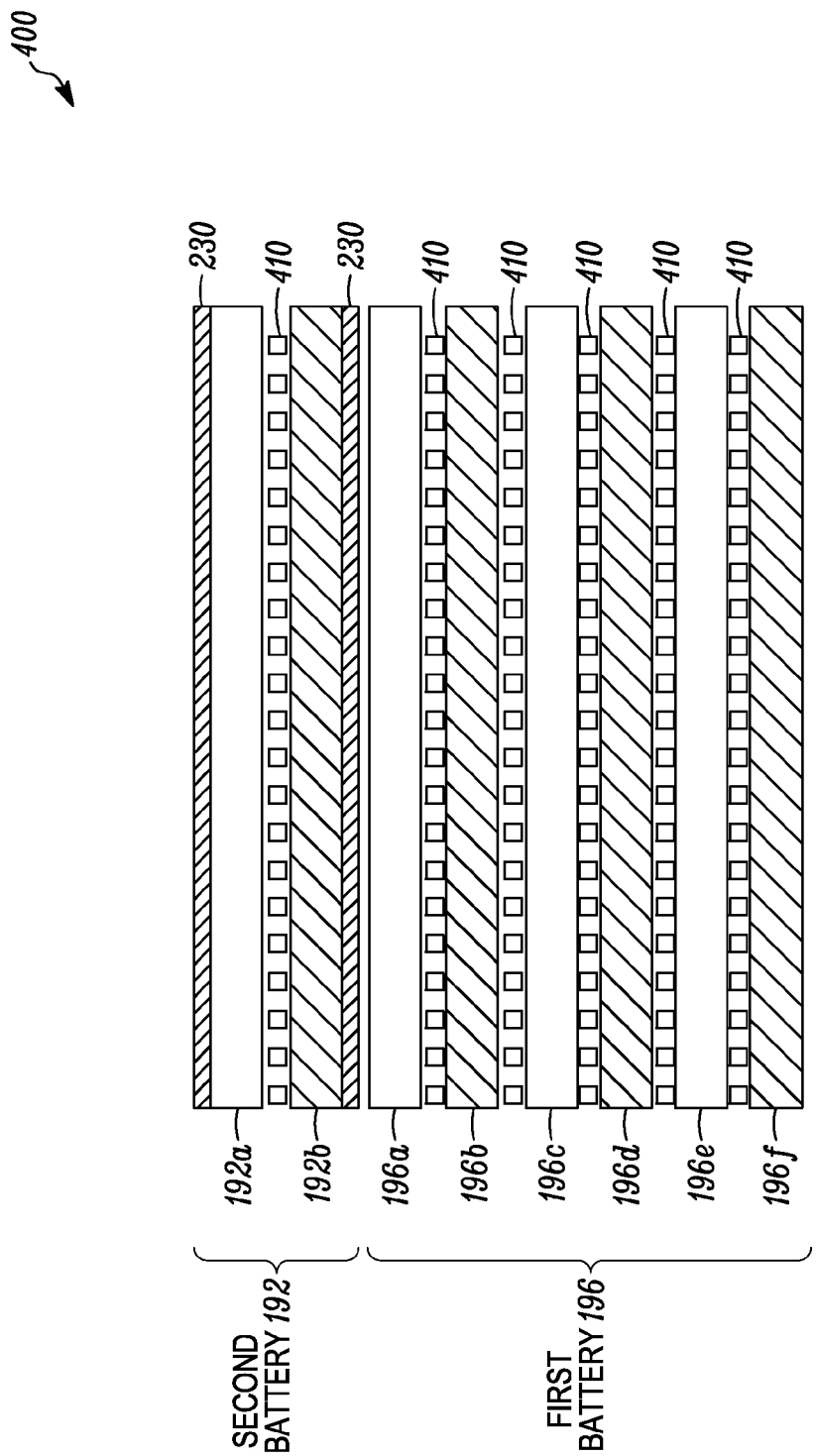
FIG. 4 illustrates an example anode-separator-cathode implementation of the battery pack, according to a possible embodiment.

FIG. 4 illustrates an example anode-separator-cathode implementation of the battery pack 190, according to a possible embodiment.

The battery pack 190 can be configured as an anode-separator-cathode stack 400. The anode-separator-cathode stack 400 can take the form of a jelly-roll, a flattened roll, or simply an individual laminated stack. Depending on the configuration, facility can be made to connect all anodes in one negative bussbar and similarly all cathodes into one positive bussbar. Thus, the battery pack 190 including the anode-separator-cathode stack 400 can be one thermal mass.

The anode-separator-cathode stack 400 can include Lithium-Ion Polymer (LIP) cells with cut-stacked electrodes. The second battery 192 can include a cathode 192a and an anode 192b, the cathode 192a and an anode 192b constituting a battery cell. The first battery 196 can include three battery cells. The first battery cell of the first battery 196 can include cathode 196a and anode 196b, the second battery cell can include cathode 196c and anode 196d, and the third battery cell can include cathode 196e and anode 196f. Each battery cell can be an independent battery. Each battery cell can be coupled in parallel to form the battery pack 190.

The cathode 192a of the second battery 192 can be separated from the anode 192b of the second battery 192 by a separator 410. Likewise, the cathode 196a of the first battery 196 can be separated from the anode 196b of the first battery 196 by the separator 410, the cathode 196c of the first battery 196 can be separated from the anode 196d of the first battery 196 by the separator 410, and cathode 196e of the first battery 196 can be separated from the anode 196f of the first battery 196 by the separator 410.

The anode 192b of second battery 192 can be separated from the cathode 196a of the first battery 196 by the thermal insulator 230. The thermal insulator 230 can border at least one of the cathode 192a of the second battery 192 and the anode 192b of the second battery 192. In at least one embodiment, the thermal insulator 230 can completely encase the anode-separator-cathode stack 400 configuration of the second battery 192 within the battery pack 190.

Although the first battery 196 is illustrated as including three cells and the second battery 192 as including one cell, the number of cells that may be included in the first battery 196 and the second battery 192 is dependent upon the configuration and power requirements of the user device 100, and can vary accordingly.

In at least one embodiment, the heating element 194, switch 210, and/or the switching logic controller 310 can be located between the first battery 196 and the second battery 192 of anode-separator-cathode stack 400. For example, the heating element 194, switch 210, and/or the switching logic controller 310 can be located between anode 192b of the second battery 192 and the cathode of the second battery 196a. In at least one embodiment, the heating element 194, switch 210, and/or the switching logic controller 310 can be located between any of the cells of the first battery 196 and/or the second battery 192. For example, the heating element 194, switch 210, and/or the switching logic controller 310 can be located between the cathode 192a of the second battery 192 and the anode 192b of the second battery 192.

Figure 5:
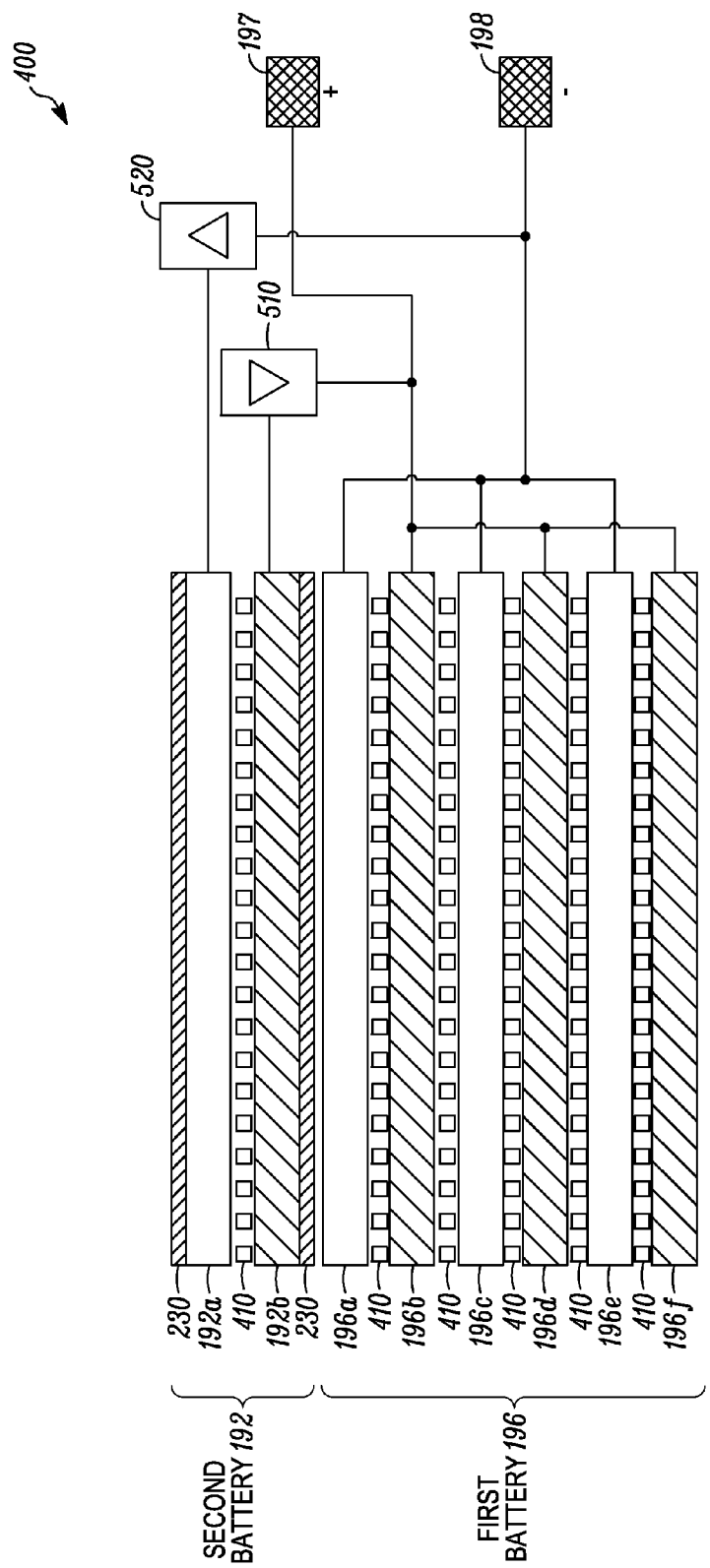
FIG. 5 illustrates an example anode-separator-cathode implementation of the battery pack including charging/discharging controllers, according to a possible embodiment.

FIG. 5 illustrates an example anode-separator-cathode stack 400 implementation of the battery pack 190 including charging/discharging controllers 510, 520, according to a possible embodiment. In particular, the first battery 196 and the second battery 192 can be coupled to a first charging/discharging controller 510 and a second charging/discharging controller 520. The first charging/discharging controller 510 can be coupled to the anode 192b of the second battery 192, the anodes 196b, 196d, and 196f of the second battery 196, and the anode terminal 197. The second charging/discharging controller 520 can be coupled to the cathode 192a of the second battery 192, the cathodes 196a, 196c, and 196e of the second battery 196, and the cathode terminal 198.

The first charging controller 510 can allow the second battery 192 to get charged, while the first battery 196 is getting charged. The first charging/discharging controller 510 can prevent the second battery 192 from getting discharged while the user device 100 is being powered by the first battery 196. The second charging/discharging controller 520 can allow the second battery 192 to discharge as needed, such as for dumping charge into the first battery 196, getting used for call, high self-heat at a same time, and other reasons for discharge.

Figure 6:
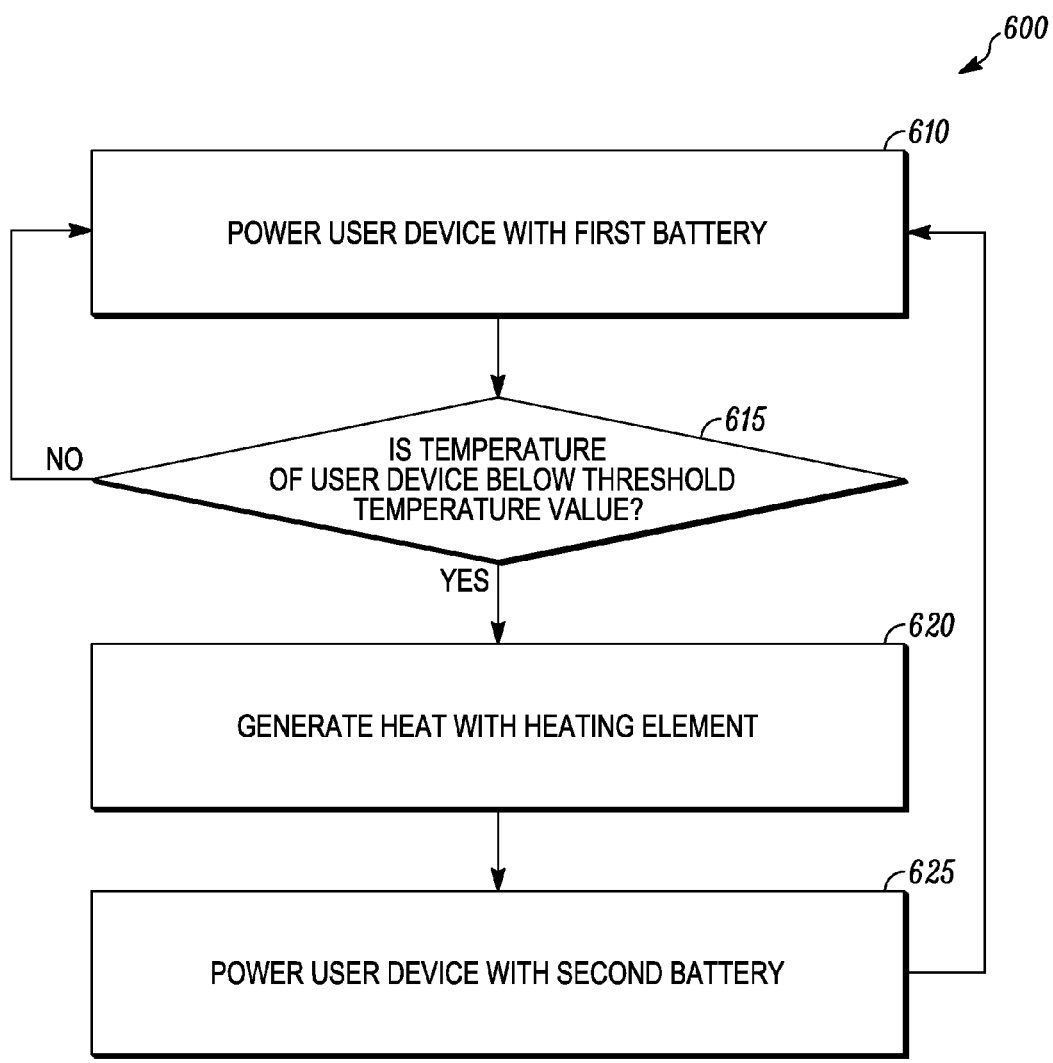
FIG. 6 illustrates an example flowchart of a method of powering a user device, according to a possible embodiment.

FIG. 6 illustrates an example flowchart of a method 600 of powering a user device 100, according to a possible embodiment.

At block 610, the method 600 can begin by powering the user device 100 with the first battery 196. The first battery 196 can power the user device 100 in response to a power button on the user device 100 being toggled. Toggling of the power button activates a switch to couple the first battery 196 to the electrical components 120, 130, 140, 150, 160, 170, 180 within the user device 100. Block 610 can proceed to block 615.

At block 615, the method 600 can determine if the temperature of the user device 100 is below a threshold temperature value. The switch 210 and/or the switching logic controller 310 can receive an electrical signal from the temperature sensor 220. If the temperature of the second battery 192 is below the threshold temperature value, block 615 can branch to block 620. If the temperature of the second battery 192 is not below the threshold temperature value, block 620 can branch to block 610 to continue to power the user device 100 with the first battery 196.

At block 620, the method 600 can generate heat with the heating element 194 and/or the second battery 192. The switch 210 and/or the switching logic controller 310 can connect the second battery 192 to the heating element 194 to generate heat for the second battery 192. In one or more embodiments, the switch 210 and/or the switching logic controller 310 can connect the second battery 192 to a load to allow the second battery 192 to self-generate heat. The switch 210 and/or the switching logic controller 310 can switch on current between the second battery 192 and the anode terminal 197 of the battery pack 190 when the temperature sensor 220 determines that the temperature of the second battery 192 is below a threshold temperature value. Block 620 can proceed to block 625.

At block 625, the method 600 can power the user device 100 with the second battery 192. The switch 210 and/or the switching logic controller 310 can switch on current flow to the anode terminal 197 of the battery pack 190. The electrical components 120, 130, 140, 150, 160, 170, 180 of the user device 100 can be powered with the second battery 192. Block 625 can proceed to block 610 to determine whether to continue to use the second battery 192 to power the user device 100.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A user device, comprising:
    a first battery configured to power the user device;
    a second battery configured to power the user device, the second battery being of a smaller capacity than the first battery; and
    a heating element configured to generate heat within the second battery to increase an operating efficiency of the second battery when a temperature of the user device falls below a threshold temperature value,
    wherein the first battery and the second battery are battery cells within a battery pack, and
    wherein the heating element directly heats the second battery instead of directly heating the first battery.

2. The user device according to claim 1, further comprising:
    a temperature sensor configured to monitor a temperature of the second battery,
    wherein the second battery is heated with the heating element to increase the operating efficiency of the second battery when the temperature sensor determines that the second battery is below the threshold temperature value.

3. The user device according to claim 1, further comprising:
    a switch configured to switch on the heating element when a temperature of the second battery is below the threshold temperature value.

4. The user device according to claim 1, wherein the heating element is a processor circuit proximate to the second battery, the processor circuit executing a processor intensive operation to generate the heat within the processor to heat the second battery.

5. The user device according to claim 1, wherein the heating element is comprised of a thin film that generates the heat when exposed to a load current.

6. The user device according to claim 1, wherein the heating element is embedded within the battery pack and proximate to the second battery.

7. The user device according to claim 1, further comprising a thermal insulator bordering at least a portion of the second battery and configured to thermally insulate the second battery to retain the heat within the second battery.

8. The user device according to claim 1, wherein the user device is a cellular telephone.

9. The user device according to claim 1, wherein the heating element is integrated within the second battery such that the second battery generates the heat inside the second battery to increase an operating efficiency of the second battery when a temperature of the user device falls below a threshold temperature value.

10. The user device according to claim 1, wherein the second battery comprises a heated second battery including the heating element.

11. The user device according to claim 1, wherein the second battery has a smaller capacity than the first battery.

12. A method of powering a user device, comprising:
    powering the user device with a first battery;
    powering the user device with a second battery, the second battery being of a smaller capacity than the first battery; and
    heating, with a heating element, the second battery to increase an operating efficiency of the second battery when a temperature of the user device falls below a threshold temperature value,
    wherein the first battery and the second battery are battery cells within a battery pack, and
    wherein the heating element directly heats the second battery instead of directly heating the first battery.

13. The method of powering a user device according to claim 12, further comprising:
    monitoring, with a temperature sensor, a temperature of the second battery,
    wherein the second battery is heated to increase the operating efficiency of the second battery when the temperature sensor determines that the second battery is below the threshold temperature value.

14. The method of powering a user device according to claim 12, wherein the heating element is a processor circuit proximate to the second battery, the processor circuit executing a processor intensive operation to generate heat within the processor to heat the second battery.

15. The method of powering a user device according to claim 12, wherein the heating element comprises a thin film that generates heat when exposed to a load current.

16. The method of powering a user device according to claim 12, wherein the heating element is embedded within the battery pack and proximate to the second battery.

17. The method of powering a user device according to claim 12, wherein the user device is a cellular telephone.

18. The method of powering a user device according to claim 12, further comprising thermally insulating, with a thermal insulator bordering at least a portion of the second battery, the second battery to retain heat within the second battery.

19. The method of powering a user device according to claim 12, further comprising charging the second battery with the first battery.

20. A user device, comprising:
a first battery configured to power the user device;
a second battery configured to power the user device;
a temperature sensor configured to monitor a temperature of the second battery;
a heating element configured to heat the second battery to increase an operating efficiency of the second battery when the temperature of the second battery falls below a threshold temperature value; and
a switch configured to switch on the heating element to heat the second battery when the temperature sensor determines that the second battery is below the threshold temperature value,
wherein the first battery and the second battery are battery cells within a battery pack, and
wherein the heating element directly heats the second battery instead of directly heating the first battery.

* * * * *